Dec. 1, 1964   M. L. BECK, JR   3,159,121
GRASS PLANTER

Filed May 12, 1964   2 Sheets-Sheet 1

INVENTOR
MARTIN L. BECK, JR.

BY Beale and Jones
ATTORNEYS

Dec. 1, 1964   M. L. BECK, JR   3,159,121
GRASS PLANTER

Filed May 12, 1964   2 Sheets-Sheet 2

INVENTOR
MARTIN L. BECK, JR.
BY Beale + Jones
ATTORNEYS

United States Patent Office 3,159,121
Patented Dec. 1, 1964

3,159,121
GRASS PLANTER
Martin L. Beck, Jr., Box 752, Auburn, Ala.
Filed May 12, 1964, Ser. No. 367,286
3 Claims. (Cl. 111—1)

This is a continuation-in-part of my copending application Serial No. 260,097 filed February 18, 1963, now abandoned, and entitled "Grass Planter."

This invention is directed to the problem of planting grass vegetatively.

Some of the newer lawn grasses must be planted as sprigs or plugs of the living grass to obtain the desired characteristics. Conventionally this is done by hand planting individual sprigs or plugs ten or twelve inches apart, which requires an enormous amount of hand labor, as an acre of ground requires 40,000 to 60,000 plugs. For satisfactory results, especially in the case of slow growing grasses such as Zoysia, it is of the greatest importance that the spacing be even and exact, which is hard to do consistently over a large area by hand. It is also of importance that the plugs be planted uniformly at the correct depth, which in hand planting requires skill and patience. It is very difficult to devise mechanical means to feed and place grass plugs uniformly, so that prior to my invention no one, so far as I am aware, succeeded in devising a machine which will plant plugs properly and at exact, uniformly spaced intervals.

It is an object of my invention to provide a machine which meets the requirements indicated above. Another object is to provide a machine which is easily maneuverable, for planting lawns of irregular shape.

Another object of my invention is to provide a novel means for severing plugs of sod from a sod piece. The disclosed severing means are especially well adapted for use in a mobile plug planter such as that described hereinbelow.

Still another object is to provide a grass plug planter which may be used alternatively for planting sprigs of grass.

These and other objects and advantages of the invention will be apparent from the following description and the appended drawings, in which.

Figure 1:
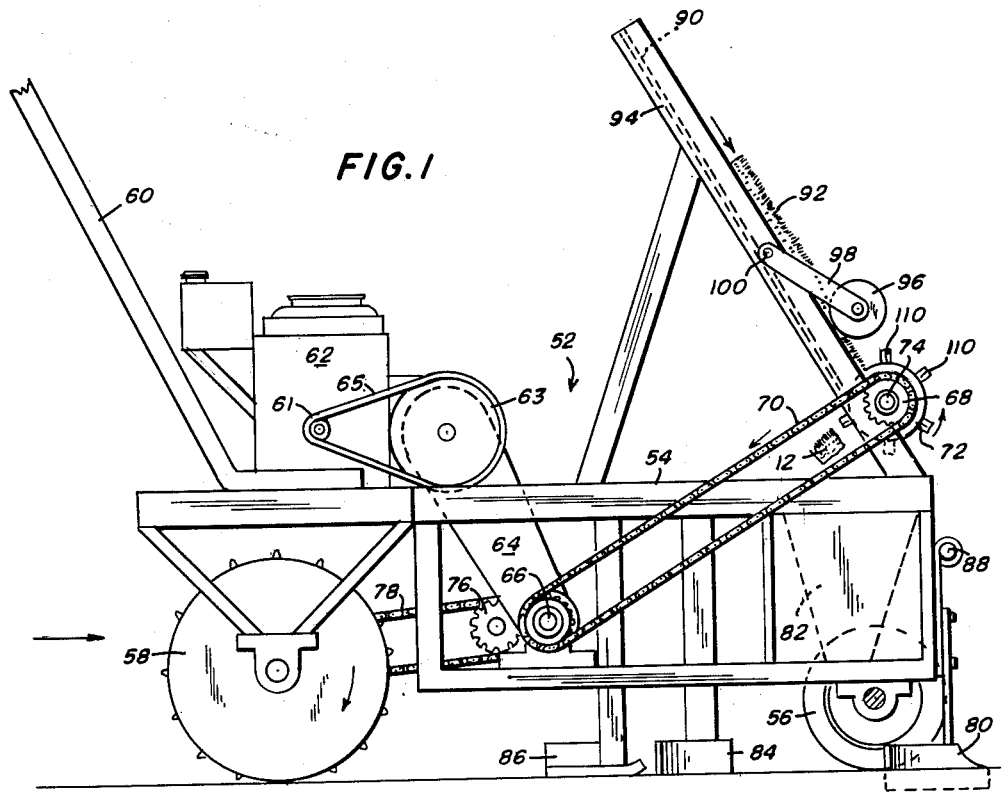
FIG. 1 is a side elevation of a grass plug planter made in accordance with my invention.

Referring now to the drawings, where like characters indicate the same or similar parts, there is shown a grass planter 52 which includes a frame 54 supported by front wheels 56 and a rear drive roller 58. Handles 60 are provided for guiding the machine. Power means such as an internal combustion engine 62 is connected through suitable mechanical connections to propel the machine along the ground and to drive the rotating severing member. Control levers and linkage, not shown, are mounted on handles 60 and connected to motor 62 for controlling its speed.

The engine 62 has a small pulley which, through belt 65, causes a relatively large speed reducing pulley 63 to rotate. Pulley 63 drives a speed reducing mechanism in housing 64, which has its output at main shaft 66. A sprocket 68 on shaft 66 drives a chain 70 which in turn causes the severing means or sod cutter 72 to rotate in a counter-clockwise direction as viewed in FIG. 1.

To propel the machine, shaft 66 drives a pair of reversing gears, one shown at 76, which drive the rear roller 58 through chain 78. This causes the machine to move in a direction from left to right as seen in FIG. 1. The roller 58 serves the triple functions of main drive roller, compacting roller, and regulator for the planting mechanism.

Planter 52 has means depending from frame 54 for planting two parallel rows of grass plugs, comprising two furrow forming plows 80 at the front, a pair of chutes 82, behind these, acting as guide means for directing grass into the furrows, and furrow closing means behind the chutes, comprising a central, horizontally V-shaped blade 84 and side blades 86. The side blades 86 are offset longitudinally relative to central blade 84; i.e., they are spaced apart as measured along the machine's path. Means not shown are provided for vertically adjusting the plows and the furrow closing blades. The furrow forming plows 80 are pivotally mounted about a horizontal rod 88, so they may be raised when the machine is being transported from one location to another.

Turning now to the sod supporting and cutting structure, it will be seen that the frame 54 carries an inclined slide 90 on which a piece of sod 92 is supported. This slide is vertically inclined; i.e., inclined with respect to a horizontal axis to an extent which permits a piece of sod thereon to move downwardly by gravity. A roll of sod, not shown, may be located above the slide to feed the sod thereto. Side members 94 are located near the longitudinal sides of the slide 90, and these are preferably sloped inwardly so the distance between them is less at the lower portion of the slide than at the top. This enables the grass to move slightly in lateral directions as it advances toward the severing means.

Toward the lower end of the slide 90 is a roller 96, supported on arms 98 which are pivotally mounted at 100. This roller 96 holds the grass in position as it is presented to the severing member 72.

Figure 2:
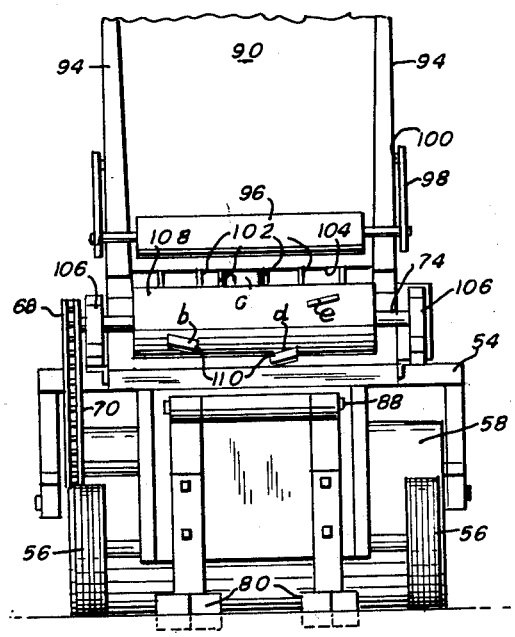
FIG. 2 is a front elevation of the planter shown in FIG. 1.

Referring to FIG. 2, the cutter structure may be seen and understood. The cutter member, generally designated 72, is located in the plane of the slide. It has a horizontal shaft 74 which is mounted for rotation in bearings 106. The shaft 74 has a continuous cylindrical enlarged portion 108 with a diameter at least as great as the thickness of the sod. A plurality of blades 110 are disposed along this enlarged portion 108. The blades extend radially from the shaft and they are oriented at various angles thereabout. The blades also may be inclined at an angle to the shaft axis, so that the cutting action of each blade will be progressive rather than instantaneous. If desired, the blades may be inclined slightly forwardly to radial lines and have their rear sides tapered downwardly to the enlarged portion 108 of the shaft. Other types of applicable cutter design will occur to those skilled in the art. Preferably, the diameter of the enlarged portion 108 is at least four times the radial dimension of a blade.

In the illustrated planter, the cutter 72 has six blades 110 which are equally spaced along the shaft and which are oriented at various angles about the shaft so there is a sixty degree arc between the blades. Three blades are disposed above each of the chutes 82. The blades are so disposed that the cutting sequence follows the order a, f, c, e, b, d; the blades being lettered consecutively from left to right, as seen in FIG. 2. Only blades c, e, b and d are seen in the drawings. It will be noted that this cutting sequence calls for alternately feeding the chutes or guide means 82, thereby giving the desired pattern of grass in the plowed furrows. The cutter may of course be used in conjunction with other devices which further dissect or treat the grass before depositing it in the furrows.

To assist in the severing action, the lower edge 104 of the slide 90 is provided with a number of relatively narrow, generally downwardly projecting stationary blade members 102. The clearance is slight between the moving blades and the stationary edge 104 and members 102, to assist in the severing action. The outermost edges of blades 110 pass proximate to the lower edge of the slide, and the side edges of the blades pass proximate to the members 102.

The operation of the cutter is readily understood. The sod piece 92 will slide downwardly in the inclined slide 90 until it abuts the enlarged portion 108. As the cutter 72 rotates, the edges of blades 110 will coact with the slide edge 104 and stationary members 102 to cut plugs 112 from the sod piece. The leading edge of blades 110 will sever the plugs transversely and the side edges will do the longitudinal severing. As the plugs are cut, the sod piece 92 will slide downwardly until its lowermost edge touches the enlarged portion 108. When each plug is removed, the sod piece slides downwardly as its lower edge is removed.

The web of sod on the slide may have its grass side facing either upwardly or downwardly. The cutting action and the falling of a plug through the chute will, of course, cause some plugs to land in the furrow with the grass side down or on its side. The latter condition has been found to be satisfactory, however, for the grass from the plugs also grows upwardly in this case.

It has been my experience that when a new sod piece is used in the machine, it does not commence sliding until about four plugs have been cut. After this, the sod piece will usually progress a short distance after each cut.

In operation planter 52 is moved over the ground by drive roller 58 and steered by handle 60. Plows 80 open a pair of parallel furrows in the ground. The severed plugs, guided by chutes 82, fall alternately into the furrows. Covering plows 84 and 86 refill the furrows. Then drive roller 68, which serves also as a compacting roller, presses the plugs and plows each down to leave a substantially flat surface planted with the spaced plugs.

It will be apparent that in my invention, the cutting means are connected with the cleated drive roller 58 so as to move in geared relation therewith. The relative diameters and ratios of the drive mechanisms are preferably selected so that plugs will be dropped at the desired spacing along the two rows; and so the sod piece will be presented to the cutters to cut plugs of the desired length. Other arrangements using a ground engaging wheel linked to a cutter driving mechanism will be obvious to those skilled in the art. Preferably, the plugs are two inches square and they are planted about twelve inches apart in each row, staggered longitudinally six inches apart, first in one row and then in the other, the rows being spaced about ten inches apart. The most satisfactory planting speed has been found to be three or four miles per hour, and this may be conveniently regulated by controlling the engine speed.

Figure 3:
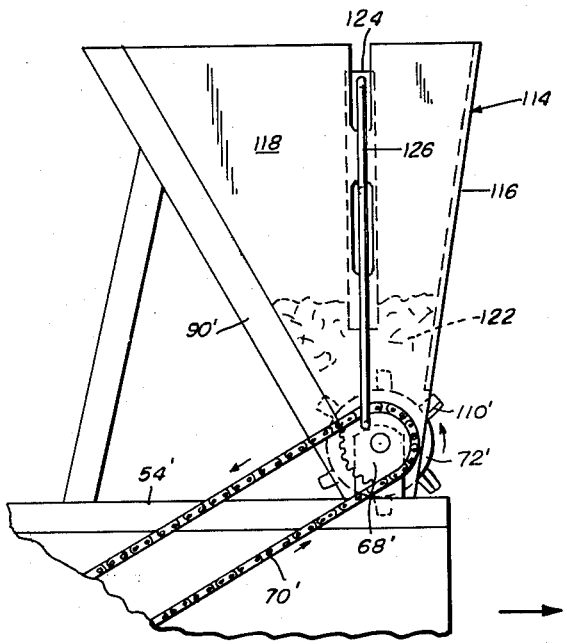
FIG. 3 is a side elevation of a portion of the planter, modified for planting sprigs of grass.
Figure 4:
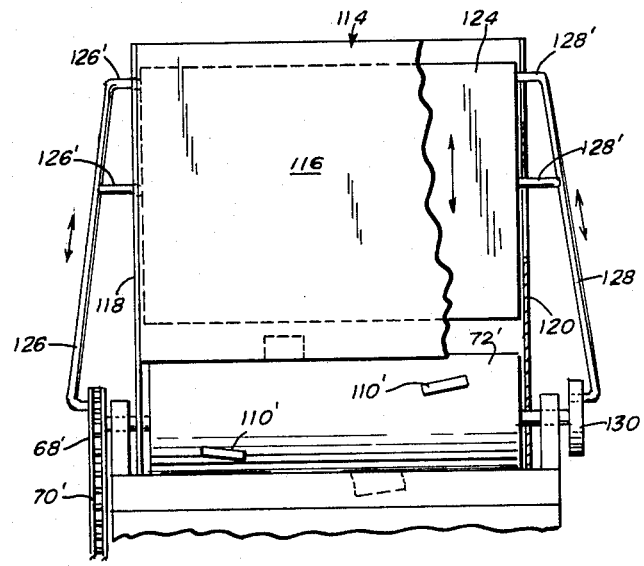
FIG. 4 is a front elevation of the structure of FIG. 3, shown partially in section.

The grass planter of this invention may also be employed to plant sprigs of grass rather than plugs when modified as shown in FIGS. 3 and 4. The basic machine is identical to that shown in FIGS. 1 and 2, having a frame 54', a cutter 72' with a series of cutter blades 110'. The cutter is rotated by means of a chain 70' which engages the teeth of the cutter sprocket 68'.

This modified version of the invention also has an inclined slide 90' which may slidably support a web of sod in the manner mentioned in the first described embodiment.

In this modification, the slide 90 forms one side of a hopper 114, which has a forward wall 116 and a pair of side walls 118 and 120. As shown in FIG. 3, a mass of grass sprigs 122 is held in the hopper. The bottom outlet of the hopper is obstructed by the cutting assembly. As the cutter 72' rotates, the blades 110' will discharge the sprigs from the hopper and evenly dispense them onto the ground.

Due to the low density of a mass of sprigs, and their resistance to flow through a hopper it is helpful to provide some means for compacting them somewhat to force them toward the rotating cutter 72', which is acting as a dispensing wheel in this embodiment. One such compacting means is a plate-like packer 124 located in the hopper and attached to supporting and driving rods 126 and 128. The rods have short extensions 126' and 128' which pass through elongated holes in the hopper walls to attach to the packer. The lowermost end of rod 126 is eccentrically attached to the sprocket 68', and rod 128 is similarly attached to a rotating wheel 130, also mounted on the cutter shaft.

During sprig planting operations, the sprigs will be evenly dispensed from the hopper as the cutter 72' rotates. The packer 124 will move in a generally reciprocating path radially toward the cutter 72', thus forcing the sprigs against the cutter so that they may be properly dispensed.

From the foregoing, it can be seen that I have provided a machine for planting grass which satisfies all of the objects and presents numerous advantages to those who have occasion to plant grass.

It is clearly understood that the invention disclosed herein is not restricted to the above-described embodiments which are only given by way of example; and that its full scope is found in the following claims.

I claim:
1. A plug planter comprising
  (a) a frame movable along the ground having furrow opening means and furrow closing means thereon,
  (b) a vertically inclined gravity slide member having a lower edge and adapted to receive a web of sod,
  (c) a series of stationary blades projecting generally downwardly from the lower edge of said slide,
  (d) a rotating cutter lying in the same plane as said slide, said cutter having a continuous and generally cylindrical surface with a plurality of blades projecting radially therefrom, said blades having outermost edges passing proximate to said lower edge of said slide and side edges passing proximate to said stationary blades to shear a piece of sod, said outer surface serving to arrest downward movement of a web of sod, and
  (e) means below said cutter for guiding a severed plug of sod into a furrow formed by said furrow opening means.
2. The plug planter of claim 1 wherein
  (f) said generally cylindrical cutter surface has a diameter at least four times a radial dimension of said blades.
3. A planter comprising
  (a) a frame movable along the ground having furrow opening and furrow closing means thereon,
  (b) a hopper having one wall formed by a vertically inclined gravity slide member having a lower edge, said hopper being adapted to hold a material to be planted,
  (c) a series of stationary blades projecting in a generally downward direction from the lower edge of said slide,
  (d) a rotating cutter member lying in the same plane as said slide and obstructing the bottom outlet of said hopper, said cutter member having a continuous and generally cylindrical outer surface with a plurality of blades projecting radially therefrom, said blades having outermost edges passing proximate to said lower edge of said slide and side edges passing proximate to said stationary blades,
  (e) means below said cutter for guiding a material to be planted into a furrow formed by said furrow opening means,
(f) a plunger located within said hopper and adapted to lie within a mass of material to be planted, means mounting said plunger for reciprocatory movement along an axis radial to said cutter, and
(g) means reciprocating said plunger in a direction generally radial to said cutter to force a material to be planted toward said cutter for dispensing by said blades.

References Cited by the Examiner

UNITED STATES PATENTS

| | | | |
|---|---|---|---|
| 773,616 | 11/04 | Willson | 275—2 |
| 2,713,835 | 7/55 | Pittman | 111—1 X |
| 2,889,878 | 6/59 | White et al. | 172—20 X |
| 2,978,942 | 4/61 | Re Casino | 172—20 |
| 3,078,892 | 2/63 | Shoemaker | 146—123 |

ABRAHAM G. STONE, *Primary Examiner.*

WILLIAM A. SMITH, III, *Examiner.*